Aug. 26, 1941.  E. BERCHTOLD  2,253,677

STEREOPHOTOGRAMMETRICAL PLOTTING APPARATUS

Filed Jan. 24, 1939

Inventor,
EDWIN BERCHTOLD.
By, Richards & Geier
Attys.

Patented Aug. 26, 1941

2,253,677

UNITED STATES PATENT OFFICE 2,253,677

STEREOPHOTOGRAMMETRICAL PLOTTING APPARATUS

Edwin Berchtold, Heerbrugg, Switzerland

Application January 24, 1939, Serial No. 252,550
In Switzerland July 19, 1938

1 Claim. (Cl. 33—1)

In photogrammetry there are known stereophotogrammetrical plotting apparatus for the production of topographical maps and charts with stereoscopic viewing of the space picture, in which the reconstruction of the sighting rays is effected by means of mechanical guide rods which are universally mounted at the position opposite every picture to be plotted, which position corresponds, when photographing, to the rear principal point (projection centre) of the objective. The space between this Cardan point and the inserted photographic picture is termed the "picture space"; on the other side of the Cardan point is the object space. The present invention relates to apparatus in which every guide rod projects into the object space as well as into the picture space.

The mounting of the said guide rods at the said point (projection centre of the chambers) involves certain difficulties of a constructional nature which, although they are put up with in the case of universal apparatus, are an obstacle in the production of simple apparatus. A main disadvantage is that the two projection centres must be at a minimum distance from each other, which distance is greater than the greatest width of a picture.

A substantial simplification would be obtained if these projection centres could be brought nearer to each other to such an extent that the distance between them corresponded precisely to the base reduced to the plotting scale, there being termed the "base" the distance, when photographing, between the two points from which the photographs are taken.

Such a simplification is obtained, according to the invention, by mounting the guide rods, not at the projection centres, but by offsetting this mounting laterally in such a manner that each guide rod passes by the picture pertaining thereto. These mounting points are then at the same distance from the picture plane (regarded as produced) as are the projection centres from their corresponding picture planes, or at a greater or smaller distance according to the similarity relationship between the figures mentioned in the following paragraph.

Also according to the invention, there are put on the picture planes displaceable marks for the measuring of the picture, which marks are connected with the corresponding guide rods by arms in such a manner that, when the guide rods are shifted, they describe figures which are congruent with or similar to those described by the point of intersection of the axis of the guide rods with the picture plane.

The invention will appear more clearly from the following detailed description, when taken in connection with the accompanying drawing, showing by way of example a preferred embodiment of the inventive idea and also illustrating diagrammatically the conditions prevailing during the photographing, and the reconstruction of these conditions for the plotting.

Figure 3:
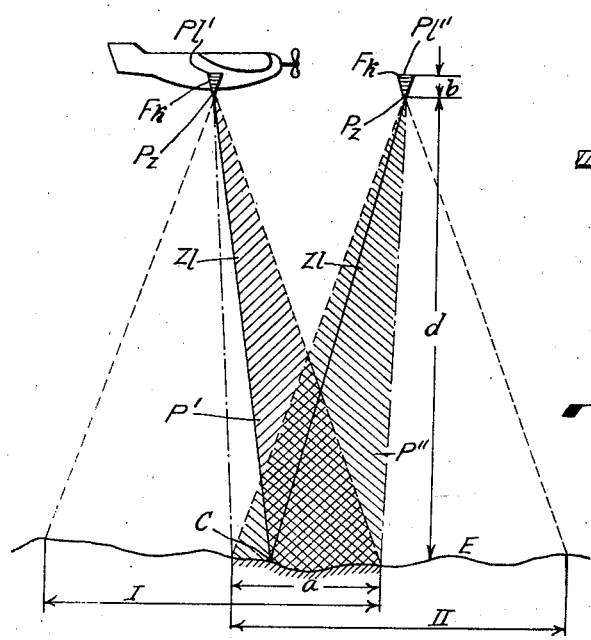
Figure 3 is a diagram, illustrating conditions prevailing during the photographing from an airplane.

Figure 3 shows an airplane, provided with a photographic apparatus, two positions of which during the photographing are designated as $Fk'$ and $Fk''$. This camera has taken pictures of two sections I and II of the ground below the airplane. These sections have a common portion $a$. The portion $P'$, which was photographed from the position $Fk'$, forms the left-hand stereoptic picture, while the portion $P''$ constitutes the right-hand stereoptic picture. The point C of these pictures has two directional rays $Zl'$ and $Zl''$, which extend through the projection center of the photographic apparatus, the two positions of the projection center being indicated as $Pz'$ and $Pz''$. The rays $Zl'$ and $Zl''$ strike the light sensitive plates $Pl'$ and $Pl''$ of the photographic apparatus. The space between the projection center of the photographic apparatus and the earth is designated as the object space, while the space between the projection center and the light sensitive plate is designated at the picture space.

Figure 4:
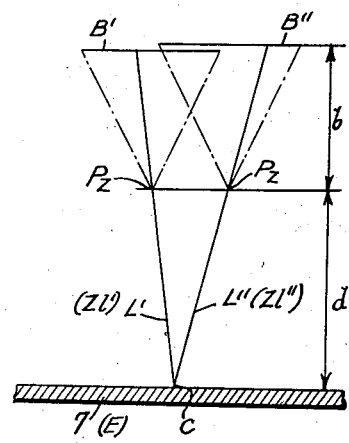
Figure 4 is a diagram, illustrating the reconstruction of the conditions prevailing during the photographing.

Figure 4 indicated diagrammatically, how the conditions illustrated in Figure 3 are reconstructed for plotting purposes. As shown in Figure 4, the points $l'$ and $2''$ correspond to and coincide with the positions $Pz'$ and $Pz''$ of the projection center of the photographic apparatus. These points also coincide with the pivotal points of the guide rods $L'$ and $L''$, which serve the purpose of reconstructing the directional rays $Zl'$ and $Zl''$.

The pictures obtained upon the plates $Pl'$ and $Pl''$ are designated as $B'$ and $B''$ in Figure 4. These pictures overlap each other in part. The space between the projection centers $l'$ and $2''$ constitutes the picture space, while the object space is situated below the picture space.

Figure 1:
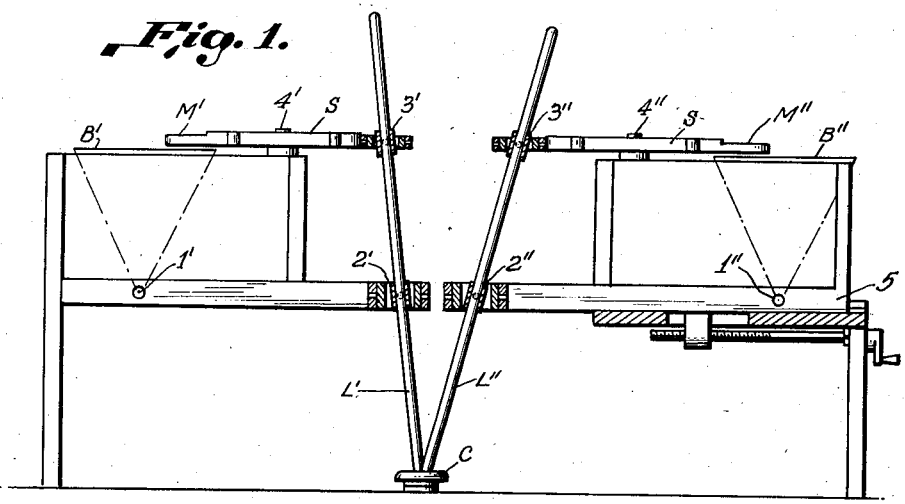
Figure 1 shows the plotting apparatus in side elevation.
Figure 2:
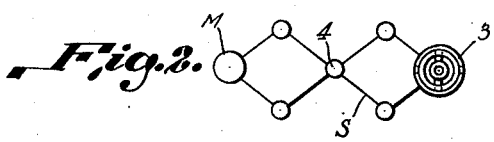
Figure 2 is a plan view, illustrating diagrammatically a detail of the apparatus.

In the apparatus shown in Figure 1, the pictures B' and B'' are situated close to the guide rods, so that the projection centers I' and I'' of the pictures do not coincide any more with the directional rays 2' and 2'' or the guide rods L' and L''. In order to locate or measure the pictures by means of the setting marks M' and M'', the latter are located upon the so-called lazy tongs S, which are mounted upon the pivot 4. There are two tongs S, and each end 3 (Fig. 2) of a tong carries a separate setting mark M' or M''. The opposite ends of the tongs carry universal joints 3' and 3'' through which the guide rods L' and L'' extend, the guide rods being movable relatively to the joints. An ordinary mirror stereoscope, which is not shown in the drawing, may be used for viewing the pictures.

I claim:

A stereophotogrammetrical plotting apparatus, comprising mechanical guide rods extending in the object-space and picture-space, separate picture-carrying means for each guide rod, said picture-carrying means extending in a horizontal plane, said guide rods being laterally offset in relation to said picture-carrying means, universally mounted collars, said guide rods being slidable in said collars which are situated approximately at the level of said picture-carrying means, lazy tongs-carrying means constituting setting marks, said setting marks extending above said picture carrying means, stationary pivots supporting said lazy tongs intermediate their ends, and means connecting said lazy tongs with said collars, whereby said marks and the centers of said collars describe, when moved, substantially similar figures.

EDWIN BERCHTOLD.